United States Patent [19]

Tesch et al.

[11] Patent Number: 4,481,247

[45] Date of Patent: Nov. 6, 1984

[54] TEXTILE MATERIAL

[75] Inventors: Günter Tesch, Fribourg; Siegfried Gieldanowski, Schmitten, both of Switzerland

[73] Assignee: Breveteam S.A., Fribourg, Switzerland

[21] Appl. No.: 109,302

[22] Filed: Jan. 3, 1980

[30] Foreign Application Priority Data

Jan. 9, 1979 [CH] Switzerland ........................... 157/79
Nov. 14, 1979 [CH] Switzerland ........................ 10152/79

[51] Int. Cl.[3] ................................................ B32B 5/02

[52] U.S. Cl. .................................... 428/234; 428/109; 428/224; 428/255; 428/284

[58] Field of Search ...................... 28/109; 428/85, 90, 428/91, 227, 234, 300, 284, 109, 224, 255

[56] References Cited

U.S. PATENT DOCUMENTS

| | | | |
|---|---|---|---|
| 1,731,591 | 10/1929 | Romane | 28/160 |
| 3,243,861 | 4/1966 | Kumen et al. | 28/109 |
| 3,457,738 | 7/1969 | Book et al. | 66/192 |
| 3,649,400 | 3/1972 | Sawaki et al. | 28/109 |
| 3,681,823 | 8/1972 | Dilo | 28/109 |
| 3,788,935 | 1/1974 | Shyne et al. | 428/293 |

*Primary Examiner*—James J. Bell
*Attorney, Agent, or Firm*—Bacon & Thomas

[57] ABSTRACT

A textile material for use in connection with a carrier includes a non-woven fibrous layer which has an irregular surface, and a plurality of separate, round, fiber aggregates, each composed of substantially spherically intermingled fibers. A multiplicity of connecting fibers connects the fiber aggregates to one another.

34 Claims, 9 Drawing Figures

TEXTILE MATERIAL

CROSS REFERENCE TO RELATED APPLICATIONS

Reference should be had to the application Ser. No. 109,304 entitled "Fiber Aggregate" filed by Günter Tesch et al., on Jan. 3, 1980, and assigned to the same assignee.

BACKGROUND OF THE INVENTION

In known textile materials of the kind described in the Abstract of the Disclosure, or of so-called textile connecting materials or non-wovens, there exists a uniform distribution of the fibers of the loosened fiber material, as well as a desired cohesion of the fiber layer, which creates favorable circumstances for connecting the fibers to the fiber layer, for example, by needle processing, such as needle punching, stiching, knitting, or the like. Known textile materials therefore have a uniform surface, and the fiber orientation corresponds to the desired anisotropic properties of the completed materials (see, for example, R. Krcma non-woven textiles SNTL Publishers of Technical Literature, Prague 1962, in co-edition with Textile Trade Press Manchester, 1967, page 43, or R. Krcma, HANDBUCH der TEXTILVERBUNDSTOFFE, DEUTSCHER FACHVERLAG GmbH, FRANKFURT/M., page 167, 1970). Although a fibrous layer may be built up, for example, of fibrous flocks, because of its resultant substantially flat cross-section, it does not provide an adequately pronounced embossment pattern on the surface of the fibrous layer. The known textile materials of the aforedescribed kind are therefore processed, or flattened, according to specific desired properties, for example, so as to obtain a specific desired visual property, or a technically non-uniform shape.

If it is desired to obtain a structured surface, then fibers deposited in a plane can be raised perpendicularly to the plane, while a loop is formed by needles using a special process, or else the fibrous layer is structured in a special arrangement and shrinking of shrinkable fibers (for example, as taught in Swiss Pat. No. 529,247) may be used.

Furthermore, colored effects can be obtained, as is known, by the use of colored fiber flocks, by mixing fiber naps or textiles of different colors, by using a needle process, such as needle punching, stitching, knitting, and the like, to attach a differently colored fibrous layer to the material. Although products manufactured in this manner show certain advantages with respect to needle-processed felts manufactured by different methods, their manufacture, as described above, is, nevertheless, much more costly. Furthermore, such materials have the typical disadvantageous feature of needle-processed felts, so that they feel not sufficiently comfortable, when used as a floor covering, for example, due to a high density of fibers. For this reason, some needle-processed felts are hardly being considered for use as a cloth or as blankets.

There are also known needle-processed carpets, in which yarns spun of wool are deposited in substantially parallel strands on a carrier, and are attached thereto by needle-processing; this attachment of the yarns to the carrier is subsequently reinforced by gluing the yarns to the carrier by binding means. Although the woolen fibers are bound to one another relatively well by the twisted and relatively thick yarns, so that less needle-processing than usual is required, and a relatively good thread structure remains, the high manufacturing cost, and, the limitations for example, as far as thickness, color or pattern are concerned, are disadvantageous. In particular, any irregularity or uneveness between the parallel groups of yarns is immediately visible in such a merchandise. Yarns of this type cannot therefore, of course, be mixed, for example, with other loose fibrous layers, so as to obtain a desired pattern.

There are also known spherical fiber aggregates from German Pat. No. DE-OS 2,811,004, in which individual fibers are intermingled, but not twisted with one another. These consist of nodules of interlocked short fibers or fiber pieces, and are suitable as sealing material or as padding. In order to obtain an adequate interlocking of fibers, it is therefore undesirable that any large number of fiber pieces accumulate. As is known, however, interlocked or felted fibers represent an irregular mass which is difficult to disentangle or unravel, or an irregular mixture of fibers in crossed positions occurring at a high density from about 0.1 gram per cubic centimeter to, for example, 0.6 gram per cubic centimeter (Jaumann, Neues grosses Handbuch der Textilkunde, Fachbuchverlag Dr. Pfannenberg & Co., Giessen, 1956, second edition, pages 689 to 693, and Handbuch für Textilingenieure und Textilpraktiker, Fachteil T 14, E. Wagner, Mechanich-Technologische Textilprüfungen, Dr. Spohr-Verlag, Wupperthal-Elberfelt, 1966, eighth edition, page 293). Products made from interlocked fibers also feel heavy to the grip (Fischer-Bobsin, Lexikon Textilveredlung und Grenzgebiete, Verlag Fischer-Bobsin, Dülmen-Daldrup, 1960, second edition, pages 694 to 695). The known fiber modules may be only attached to one another by binding means, or through another material, for example by being attached to a carrier. Particularly due to their short fiber length of about 3 mm, and their dense structure, the use of these fiber modules is therefore rather limited. The fiber modules cannot be used for textile materials, when products of relatively low hardness and low density are desired, or if further processing of such materials is required, based on the structure of such materials, and without the use of any binding means, for example, for the fabrication of substantially flat textile materials.

There are further known (from German Pat. No. DE-12 83 084 or French Pat. No. FR 14 22 835, German Pat. No. DE-AS 15 61 65, or Belgian Pat. No. BE 682.175), ball-shaped fiber aggregates which have a diameter of about 5 mm, in which wooden fibers are merely laid next to one another, and which are manufactured, while they are suspended in a watery liquid, so as to avoid that they are dissolved or decomposed as a result of a turbulance acting thereon for several hours. The fiber balls separated from the watery liquid and dried thereafter have a density of about 0.02 to 1 grams per cubic centimeter, and correspond in their size to the length of the fibers, which varies from about 0.2 mm to about 15 mm. As the size of the ball-shaped yarn is dependent on the respective fiber length, building up of the ball-shaped yarn from fibers disposed next to one another is therefore dependent on, and limited to, the use of selected fiber materials. Fibrous aggregates of this type are therefore only suitable for the manufacture of modular plates, shaped elements, or paper.

Also combustible spherical fiber aggregates, known from French Pat. No. FR 898.980, are constructed of interlocked fibers, and therefore do not have any properties which are suitable for any other than a combustible material.

SUMMARY OF THE INVENTION

It is therefore one of the principal objects of the invention to devise a textile material of the aforedescribed kind, which does not have any of the disadvantages of known substantially flat textile materials, in which, for example, a surface of a desired predetermined pattern is to be created. The textile material should further be structured so as to be designed or colored as desired, without incurring any great expense, and without subjecting the fiber material of its fiber layer to any heat or pressure, or to any additional measures; it should further have a wide variety of uses.

This object is attained, according to the invention, by providing a textile material which has a non-woven fabric layer and an irregular surface, and includes a plurality of separate, round fiber aggregates, each composed of substantially spherically intermingled fibers, and a multiplicity of connecting fibers interconnecting the fiber aggregate.

Further objects and advantages of the invention will be set forth in part in the following specification, and in part will be obvious therefrom without being specifically referred to, the same being realized and attained as pointed out in the claims hereof.

BRIEF DESCRIPTION OF THE DRAWINGS

For a fuller understanding of the nature and object of the invention, reference should be had to the following detailed description, taken in connection with the accompanying drawings, in which.

DESCRIPTION OF THE PREFERRED EMBODIMENTS

Figure 1:
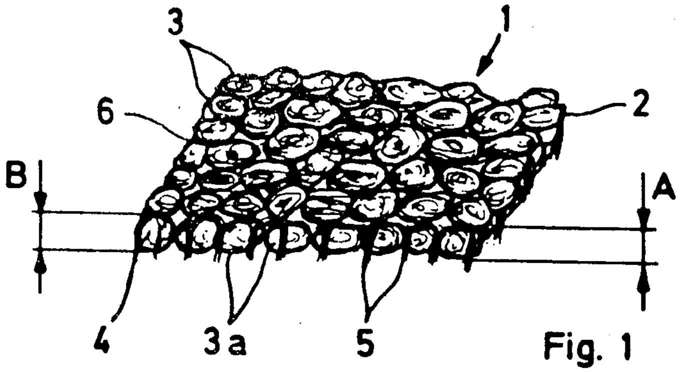
FIG. 1 is a perspective view of a textile material in section, according to the invention.

In carrying the invention into effect, a textile material 1 includes, according to FIG. 1, a non-woven fibrous layer 2, which contains individual fiber aggregates 3. Each fiber aggregate 3 is composed of fibers 4, which are substantially spherically intermingled, or rolled into one another, for example in the form of a skein. The fibrous layer 2 is composed of the fiber aggregates 3, which are substantially round, ball-shaped yarns 3*a*, initially separated from one another. The substantially ball-shaped yarns 3*a*, and consequently the fibrous layer 2 are, during the manufacture of the textile material, connected to one another, for example, by needle processing, of fiber pieces 5, which form part of the fibers 4 of each fiber aggregate or ball yarn 3*a*. The fibers 4 may therefore be used and gripped by needles, which are commonly used to stitch materials together in textile technology, such as felt needle-processing, without encountering any substantial resistance, and without the needles substantially destroying the fibrous layer, or being subjected to any undue wear and tear. The needles are preferably moved in a direction transverse, or at an angle to, the plane of the fibrous layer 2, and pass through the fiber aggregates or ball-shaped yarns 3*a*. As can be seen from FIG. 1, the textile material 1 consists of a fibrous layer 2 composed of the ball-shaped yarns 3*a*; the ball-shaped yarns 3*a* preferably have a regular shape, and are of similar dimensions, so that the fibrous layer 2 has a predetermined depth A, which is equal to the prearranged depth or diameter B of each ball-shaped yarn 3*a*. The ball-shaped yarns 3 can, however, also be interconnected by other appropriate needle processing techniques, for example, by the Maliwatt-, the Malimo- or the Malipole processes. As a result of the use of ball-shaped yarn 3*a*, the textile material 1 has an irregular, for example, knob-like structured surface 6. If required or desired, the connection of the fibrous layers 2, to any projecting fiber-pieces 5, can be further reinforced by (non-illustrated) binding means.

Figure 2:
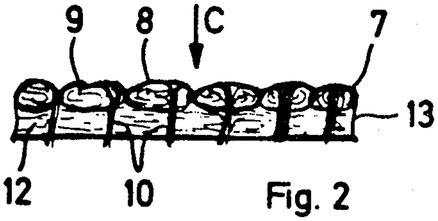
FIG. 2 is an elevational section of a textile material including a carrier layer.
Figure 3:
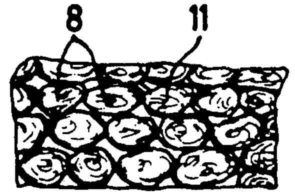
FIG. 3 is a plan view of a portion of the textile material, as seen along the arrow C of FIG. 2.

As shown in FIGS. 2 and 3, there is shown a non-woven fibrous layer 7 composed of substantially ball-shaped yarns 8, which contain substantially spherically intermingled fibers 9; the non-woven fibrous layer 7 has therefore an irregular, for example, structured surface 11. By means of needle-processed fiber-pieces or end pieces 10, which may be part of the ball-shaped yarns 8, the fibrous layer 7 is connected to a carrier 12, for example made of fleece, so that a textile material 13 is obtained.

Figure 4:
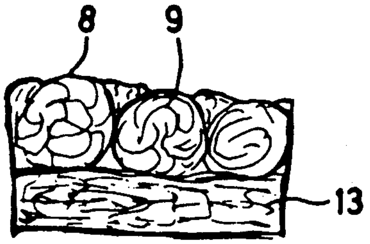
FIG. 4 is an elevation view in section of a detail of FIG. 2, prior to connecting the fiber aggregates to one another and to the carrier.

As shown in FIG. 4, the ball-shaped yarns 8 have, when they are deposited, for example, on a carrier 13, a substantially round shape before they are connected to one another, for example, by needle-processing. As a result of being connected to one another, the previously round ball-shaped yarns 8 are flattened, as shown in FIG. 2, and the flattening depends, for example, on the strength or adhesive quality of the needle-established connections, or on the fluffiness or bulkiness of the ball-shaped yarns 3*a*. As a result of the needle-processing, the textile material may also be constricted as desired, so that an original structure can be obtained, such as is not, for example, possible using substantially two-dimensional fibers disposed essentially in a plane.

Figure 5:
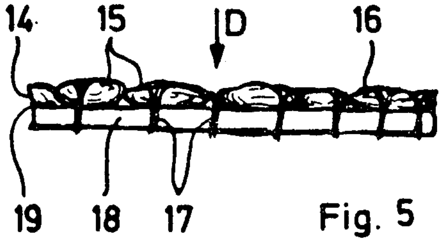
FIG. 5 is an elevation view in section of another textile material, including a carrier.
Figure 6:
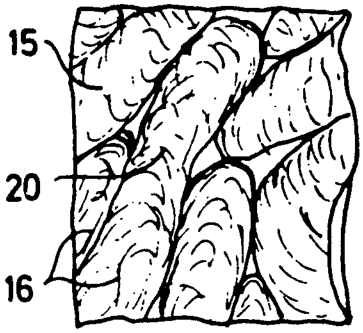
FIG. 6 is a plan view of a portion of the textile material shown in FIG. 5, as viewed along the arrow D of FIG. 5.

According to FIGS. 5 and 6, a non-woven fibrous layer 14 is composed of worm-shaped fiber aggregates 15 of different sizes, and each fiber aggregate 15 has yarns or fibers 16, which are substantially spherically intermingled. The fiber aggregates 15 are attached through fiber pieces 17 to a carrier 18, for example, by means of needles, and the fiber aggregate 15 and the carrier 18 together then form the textile material 19. As a result of the varying sizes and shapes of the fiber aggregates 15, there is obtained an irregular surface 20, which has a unique embossment structure.

Figure 7:
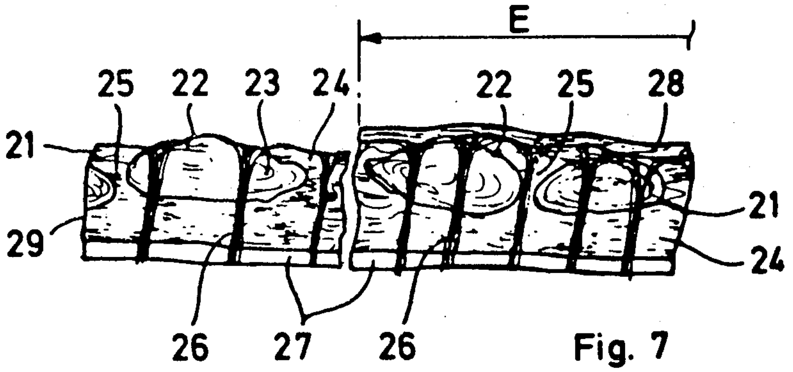
FIG. 7 is an elevation view in section of a modified textile material.

A fibrous layer 21, according to FIG. 7, is composed of separate, distributed and round fiber aggregates 22 of substantially spherically intermingled fibers 23. The fiber aggregates 22 are embedded in a fibrous material 24, which fills the spaces 25 between the fiber aggregates 22, and forms together therewith the fibrous layer 21, which has an irregular surface. The fiber aggregates 22 and the fibrous material 24, are connected, through connecting fibers, such as fiber pieces 26, to one another and to a carrier 27, for example by needles. As is shown in a part E in FIG. 7, a covering layer 28 may be disposed above the fiber aggregates 22, which is composed of a fiber material of a different construction or consistency then that of the fiber aggregates 22; the fiber aggregates 22 may be connected to the carrier 27 through the covering layer 28 by needle-processing. The fibrous layer 21, composed of the fiber aggregates 22, the fiber material 24, and the covering layer 28, together with the carrier 27, form a textile material 29, which has, for example, a patterned surface.

Figure 8:
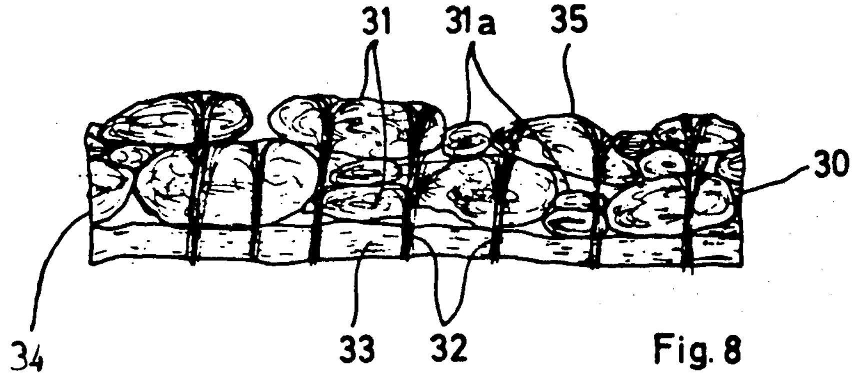
FIG. 8 is an elevation view in section of another modified textile material.

As is shown in FIG. 8, a fibrous layer 30 is composed of fiber aggregates 31 and 31*a* of different respective sizes, which are connected by needle-processing through fiber pieces 32 to a carrier 33. A textile material 34 is obtained, which has a distinct embossment surface 35.

It is also possible to use shrinkable fibers in the fiber aggregate, for example, the ball-shaped yarns 31 or 31*a*, so that during the shrinkage either the fiber aggregate may shrink with respect to another fiber aggregate, or the fiber aggregate may shrink with respect to a support, such as the carrier 33. This does not cause, for example, the appearance of any sudden change in the width of the material, as shrinkage does not take place across the width of the material, as a result of using fiber aggregates, or ball-shaped yarns.

Figure 9:
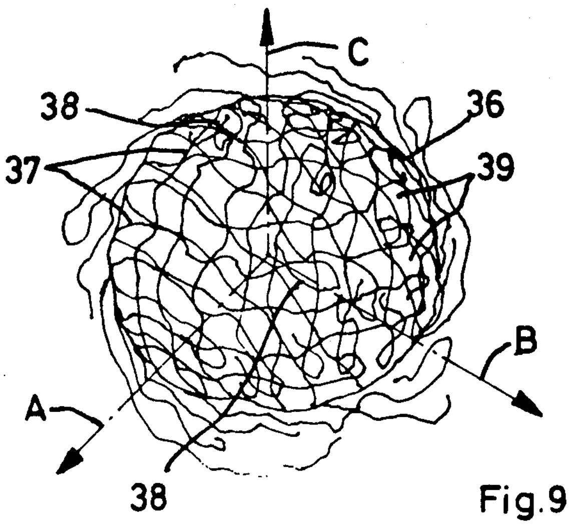
FIG. 9 is a sectional view of a single fiber aggregate of the textile material.

FIG. 9 shows how a ball-shaped yarn 36 is built up from individual fibers 37, which are substantially spherically intermingled. The fibers 37 are intermingled loosely, so that their ends 38 are also loosely intermingled with other fibers or yarns 37, or rolled thereround in a substantially spherical manner, so that the fibers 37 are maintained within the fiber formation. The substantially spherical orientation of the fibers or yarns can be recognized from the substantially spherical shape of the ball-shaped yarn 36 in the spatial dimensions along the arrows A, B and C.

The fibers 37 are disposed within the ball-shaped yarn 36 loosely, and are not interlocked, felted or intertwined with other fibers; air spaces 39 are therefore formed between the fibers 37, which have dimensions which substantially exceed the thickness of the fibers 37 themselves. The fibers 37 are thus substantially separated from one another, have a length of at least 15 mm, and make contact with one another only because they are loosely intermingled. One therefore obtains a structure of loosely intermingled fibers 37, so that each fiber 37 can be individually gripped without offering any substantial resistance, and without there occurring any disintegration of the ball-shaped yarn 36, so that the fibers 37 can be individually withdrawn therefrom. The ball-shaped yarn 36 has therefore a low needle processable density and, for example, a fluffiness of a type so that it can be squeezed together without the exertion of any significant force thereon. As a result of the spherically intermingled fibers 37, the ball-shaped yarn 36 has an elasticity or springiness which extends in three dimensions, so that it can substantially resume its original shape, after a stress exerted thereon has been removed. Such a springiness cannot be obtained, for example, in fibers which are disposed substantially in a plane along only two dimensions, or in the case of twisted fibers or yarns, which lie closely to one another as a result of a twist being imparted thereon, and therefore have a homogeneous density. With respect to conventional yarns, one obtains a mechanical cohesiveness between fibers, which is exclusively the result of the substantially spherical intermingling of the fibers, or the substantially spherical rolling up of these fibers; this method of intermingling furthermore prevents a dissolution of the ball-shaped yarn 36. This cohesiveness can be increased further, for example, by the use of curled fibers, for example, by using a percentage of about 40% of polypropylene fibers. The fiber aggregates composed of substantially spherically intertwined fibers, as used in textile materials, according to the invention, have, for example, totally different properties compared to the aforedescribed known hard textile materials, which are composed of interlocked fibers, and which, due to their short fiber length of about 3 mm, cannot be gripped and processed by needles. The ball-shaped yarns of the textile material, according to the invention, are not comparable with a burl or a knub, which as is known, consist of a randomly intwined mass of fibers tied together to form a nodule or knot (P. Böttcher, Textiltechnik, VEB Fachbuchverlag, Leipzig, 1970, pages 750 and 758). They are therefore also hard formations composed of interlocked fibers at a high density, and can therefore not be utilized either in textile materials, according to the invention. A nodule or knot is furthermore an undesired defective product of a size smaller than about 3 mm, for which reason such a nodule or knot cannot be processed by needles, and furthermore contains, for example, only about 10 individual fibers or yarns. The ball-shaped yarn of the present invention, however, is composed, for example, of many more than about 10 individual fibers or yarns.

The ball-shaped yarn such as, for example, the ball-shaped yarn 3*a*, may, prior to its usage in a textile material, be strengthened, or be made more cohesive separately. For this purpose, the natural interlocking capability of woolen fibers can be made use of, as a result of which the ball-shaped yarn can be strengthened further, while still retaining a density of fibers, which may be processed by needles beyond the cohesiveness due solely to the spherical intermingling of the fibers. The ball-shaped yarn may, however, also be impregnated, or treated by binding means. The loose structure provides an advantage, as the surface of the individual fibers may be reached by the binding means, so that the binding means can fully penetrate into the ball-shaped yarns; this also applies to coloring means. In the case of knots or nodules, or even in the case of twisted yarns, the surface of the individual fibers is, however, blocked by adjacent fibers, so that it cannot be reached in the same manner as in the ball-shaped yarns.

Table 1 below shows typical parameters as a function of the yarn material.

TABLE 1

| | PP* | Wool | PP/Wool |
|---|---|---|---|
| Diameter of ball-shaped yarn | 5–15 mm | 5–10 mm | 5–15 mm |
| Length of stack | 90 mm | 60 mm | 60/90 mm |
| dtex | 17 | 3–45 | 17/3–45 |
| Stitch density per cm$^2$ | 100 | 64 | 126 |
| Stitch depth in mm | 20 | 25 | 20 |
| Needle Number | 30 | 30 | 30 |

*PP = Polypropylene

The conditions for use are, for example, only a single parameter in a series of conditions, which, for example, are determined by the qualitative requirement for the ball-shaped yarn, or of the textile material. The needle densities, or stitched densities, can be maintained equal for different sizes and fiber types of the ball-shaped yarn; but it is also possible to reduce the needle-processing or stitch density by about 25% to 50%, if this is advantageous, for example, as far as the size of the ball-shaped yarn, type of fiber or the like is concerned, because a certain entanglement of the fibers by spherical intermingling in the ball-shaped yarn has already taken place prior to stiching. The ball diameter, namely the size of the ball-shaped yarn, is, for example, independent of the fiber length. Thus, it is possible to manufacture ball-shaped yarns, which use the same fiber length, which have a diameter of 4 mm, and also ball-shaped yarns which have a diameter of 25 mm. The size of the ball-shaped yarns can furthermore be dependent on the diameter or thickness of the fiber, any curling of the fiber used, or the E-module of the fiber.

As a result of the rolling capability of the ball-shaped yarns, a multiplicity of ball-shaped yarns, such as ball-shaped yarns 3*a*, 8, 15, 22, 31, or 31*a* can be distributed arbitrarily, for example, unordered or at random, as a single layer, or as several layers, one above the other. It is therefore possible to devise a fibrous layer with a corresponding surface embossment structure, and to create a special, for example, visual effect. But, it is alternately possible to arrange, for example, for an ordered deposition of a multiplicity of ball—shaped yarns, such as for example ball—shaped yarns 31 or 31*a*, in a desired and predetermined arrangement, for example, so as to form a predetermined pattern, in rows, in squares, and the like. By an ordered deposition, the fiber material available in the shape of the ball—shaped yarns may be arranged, for example, for needle—processing in a surprising manner. The fiber material may therefore be deposited on a desired location of the fiber layer to be manufactured, and may be appropriately interconnected, or attached to a carrier. For example, an arrangement in parallel rows, such as using ball-shaped yarns offset with respect to another, can be attained, which has hitherto been only possible, if at all, at a correspondingly high expense.

Thus, it is possible, for example, to devise weblike structures. But it is also possible to first deposit a layer of ball-shaped yarns, for example ball-shaped yarns 3*a*, of a relatively large diameter, and to fill the gaps between the relatively large-diameter ball-shaped yarns with ball-shaped yarns of a relatively smaller diameter.

Summarizing then, and based on the recognition that twisted yarns as a result of their initial cohesiveness require, for example, less needle-processing than loose fibers, but result in a relatively more costly product, which is difficult to count and difficult to combine, the present invention proposes a product composed of spherically intermingled fibers, such as fibers 4, which have been denoted as fiber aggregates or ball-shaped yarns. As a result of their structure, the ball-shaped yarns, for example the ball-shaped yarns 3*a*, are preferably more or less rollable, in contrast to fibers or fiber flocks on one hand, and conventional yarns on the other hand; this does, for example, facilitate the process of combining and positioning the ball-shaped yarns within the fibrous layer considerably, and indeed makes such a process at all possible. The shape of these fiber aggregates, such as ball-shaped yarns 3*a*, may be either spherical or spheroidal, for example, shaped as an ellipsoid, namely they may have a longitudinal or stretched shape, but in cross-section, are preferably, for example, round. At a width-to-length ratio of, for example 1:1, the ball-shaped yarn is then substantially or completely round, while at a width-to-length ratio of, for example, 1:2, it is substantially shaped like an ellipsoid, and at a width-to-length ratio of, for example 1:3 up to 1:5, it is substantially worm-shaped. But, it may also be shaped substantially like a cylinder. Aggregates of this type composed, for example, of many types of textile fibers can be handled well, as a result of their rollability, when mixing and forming layers. The ball-shaped yarns, for example ball-shaped yarns 3*a*, contain individual fibers of finite length, and their shape and round cross-section are due to the arrangement of the fibers, which are, for example, spherically intermingled, or rolled into one another. The ball-shaped yarns may, however, also be composed of fibers, which include helically intertwined fiber elements.

It is one of the characteristic features of the invention that the ball-shaped yarns, for example, the ball-shaped yarns 3*a* of the textile material, have fibers which are not interlocked with one another, in which the fibers have a predetermined needle-processing density and structure, and are of adequate length, preferably of a length of at least 15 mm. Furthermore, the fibers follow more or less the curvature of the ball-shaped yarns, or are correspondingly oriented, so that they are substantially spherically intermingled. Due to the needle-processable density, the fibrous layer of the textile material, according to the invention, can therefore be obtained by interconnecting the fiber aggregates not only by stitching, but also by knitting or crocheting.

The fiber aggregates, or ball-shaped yarns, may be given predetermined properties as far as size, texture, color and shape are concerned, and these may be either similar to one another, or may be different from one another in at least one of the aforenoted properties.

These and other properties of the ball-shaped yarns are also disclosed in co-pending application entitled "Fiber Aggregates" assigned to the assignee of the present invention.

In textile materials, according to the invention, these fiber aggregates can be denoted as kinetically self-contained parts, as a result of which an uneven surface is obtained, which can be provided with a pattern as desired, for example, structured in the form of burls, and may also be colored with different colors. By the intermingled arrangement of the fibers, these are maintained within the ball-shaped yarns, and have, for example, a predetermined cohesion with respect to one another, similarly to, for example, that of a conventional and loosely twisted fiber yarn: Consequently, if desired, the cohesion of the layer by needle-processing or the like, may be less intense, so that a greater thickness and elasticity of the product, as well as a better maintenance of the structure can be obtained. As a result of the substantially spherically intermingled fibers, for example, the fibers 4, these are adequately loosely arranged, so that the ball-shaped yarns, for example ball-shaped yarns 31 and 31*a*, may be interconnected with one another, or connected to a carrier, such as carrier 33, by fiber end pieces of the fibers in an advantageous manner, so that the ball-shaped yarns may be alternatively denoted as being actively needle-processable. But the ball-shaped yarns may be also interconnected by connecting fibers, which are passed or pulled through the ball-shaped yarns or led therethrough, in which case the ball-shaped yarns are said to be passively needle-processable.

As a result of the shape of the ball-shaped yarns, one obtains an end product of closed dimensions and a closed structure within which there are disposed fibers, such as fibers 4, which do not extend parallel to one another, and a surface in which the fibers, particularly the respective fiber ends, are maintained in the interior of the ball-shaped yarn, and are therefore secured from falling out from the ball-shaped yarn. In spite of the fact that the ball-shaped yarns are actively needle-processable, the ball-shaped yarns have a greater cohesion, for an example, and improved tensile strength, and abrasive resistance, than known and untwisted fiber aggregates, for example, a fiber flock, where the fiber flock contains fibers on its surface, which project therefrom, and are not secured against being pulled out.

The connecting fibers include not only those used for needle-processing non-woven materials, for example, fleeces or textile connecting materials, but also those used in the process of knitting, crocheting, and the like, whether needle-processed or interconnected actively or passively. The ball-shaped yarn may, however, in a multi-needle process, also be stitched, knitted or crocheted together, for which reason fibers or stitchable threads will be understood to be designated as connecting fibers.

Depending on the desired pattern and/or shape of the ball-shaped yarns, these may comprise between 10% to 100% of the total weight of the fibrous layer. Depending on the type of fiber and/or quantity of fibers used, or the desired pattern, the round ball-shaped yarns may have a diameter from about 3 mm to about 50 mm. The worm-shaped fiber aggregates may have a thickness from about 3 mm to about 50 mm, and a length, for example, from about 9 mm to 150 mm. The size or width of the individual ball-shaped yarn depends, inter alia, for example, apart from the thickness of the fibers, on the type of the fibers, and the length and quantity of the intermingled fibers. In the unconnected state, the fiber density in a loose and deposited ball-shaped yarn may have a value from about 0.01 grams per cubic centimeter to about 0.1 grams per cubic centimeter.

The textile materials therefore have preferably novel properties which depend, for example, on the type, density and interconnection of the ball-shaped yarns, for example, ball-shaped yarns 3a. The ball-shaped yarns may have similar or different consistencies. Each ball-shaped yarn, for example ball-shaped yarn 3a, may contain only one type of fibers, or mixtures of fibers, or may have one or several colors. In an advantageous manner, the fibers, such as, for example, the fibers 4, of the ball-shaped yarns may have different lengths, and thus be composed of relatively short fibers, or may contain fibers of, for example, waste yarns, namely yarns of differing manufacture and different colors. These can be natural fibers, such as, for example, cotton or woolen fibers, or animal fibers, such as lamb fibers, fur fibers, or the like, or synthetic fibers of various types, for example, one or several multifilaments, such, as for example, those composed of polyamide, polypropylene, polyesther, glass fibers of the like; textured, or for example, curved fibers provide an additional structure and/or fluffiness. It is also possible to use a mix of ball-shaped yarns composed of natural fibers, on one hand, and of synthetic fibers, on the other hand, The length of the stacks can be chosen arbitrarily within the scope of the manufacture, and may range from about, for example, 40 mm, to about 120 mm. The titer of the fibers may range from about 3 dtex to about 100 dtex, and lie preferably between 6 and 40 dtex; it is advantageous, for example, to admix a certain percentage of coarse fibers for a desired structure.

In an advantageous fashion, a ball-shaped yarn, such as the ball-shaped yarn 3a, may lie next to another ball-shaped yarn. Thus, a single-layered aggregate, and consequently a single-layered textile material may be formed, which has a depth, for example, corresponding to the thickness of the ball-shaped yarns following needle processing. But it is also possible to employ alternately superimposed ball-shaped yarns, so that a correspondingly thicker fibrous layer is formed, and the ball-shaped yarns, such as the ball-shaped yarns 31 and 31a may have differing sizes and diameters, and it is also possible, for example to mix different ball-shaped yarns with one another. The fibrous layer, such as, for example, the fibrous layer 21, may be composed of a plurality of ball-shaped yarns of a relative large diameter, and a layer of ball-shaped yarns of relatively smaller diameters superimposed thereto; both layers can then be interconnected by needle processing or the like.

In a further embodiment of the invention, the ball-shaped yarns in the fibrous layer may also be composed of fibrous material, for example, of the aforedescribed consistency used for the ball-shaped yarns; but they may have a different shape or form by using, for example, longitudinal fiber elements, fiber flocks or a mixture of fibers. Alternatively, the ball-shaped yarns may be embedded in the fibrous layer if this is desired, for example, for improving the interconnection or consistency of the material, the pattern, or filling of any spaces or gaps between the ball-shaped yarns. A mixture of ball-shaped yarns with a fibrous material of different consistency can be advantageous, for example, if a textile material, according to the invention, is used for outer garments.

The fibrous layer, including the fiber aggregates, may, however, also be attached to a carrier, for example the carrier 10, by needle processing, such as stitching so that the ball-shaped yarns also become attached to the carrier.

The ball-shaped yarns may, in particular, however, also be loosely deposited on the carrier, and attached thereto by needle processing, such as stitching or the like. The carrier may be a passively needle-processable material, as has been previously defined, such as a sheet of synthetic material, a screen, a netting, a mesh, a web, a cloth, a fabric, a fibrous connecting or non-woven material or layer, cotton, a paper product, such as paper or cartons, or the like. In a further modified version, the carrier may also be an actively needle-processable material, as previously defined, so that the textile material may be additionally needle-attached to the carrier, for example, by stitching the textile material to the carrier from the carrier side. It is furthermore also possible to superimpose and attach a covering layer, such as the covering layer 28, of a material of different shape or form, than the ball-shaped yarns themselves to the fibrous layer. This covering layer may, for example, be composed of textile fibers, or may have a non-textile consistency or composition, such as, for example, of the type used in the carrier, and may be needle-attached to the carrier and/or ball-shaped yarns. The use of a covering layer, for example, the covering layer 28, may prevent any damage due to too strong an active needle-processing, such as stitching of previously reinforced ball-shaped yarns. Any risk of damaging the ball-shaped yarns may, however, also be avoided by the aforedescribed mixing of the ball-shaped yarns with a fibrous material of different consistency.

The fibrous layer preferably contains the ball-shaped yarns over the entire extent of the textile material; but the ball-shaped yarns may be disposed only on a portion of the textile material, according to a desired pattern. In this manner, textile patterns of any desired structure, any desired consistency, and any desired visual pattern or, for example, any desired aesthetic design, can be created. The textile material, according to the invention, can be used as a textile cloth, for example, a wall covering, a floor covering, a blanket, a garment, as a decorative material, or as covering material, such as an upholstery material, for example, for upholstering padded furniture, but also as an insulating material. The ball-shaped yarns may also be fabricated for example, by intermingling or rolling-up of fibers between fingers of a hand, so as to form the fibers into balls, or into longitudinal shapes; thus it is possible, for example, to devise web-like structures.

Technical manufacturing methods for spherical fiber aggregates are known, for example, from the already mentioned German Pat. No. DE-OS 28 11 004.

I wish it to be understood that I do not desire to be limited to the exact details of construction shown and described, for obvious modifications will occur to a person skilled in the art.

Having described the invention, what I claim is new and desire to be secured by Letters Patent is as follows:

1. A textile material comprising a non-woven fibrous layer having an irregular surface formed by needle bonding a plurality of separate fiber aggregates, each aggregate having, prior to needle bonding, a substantially spherical to elongated shape with a smallest diameter of no less than 3 mm, said aggregate is formed from intertwined fibers which include fibers having a length of at least 15 mm, said aggregate also having a density ranging from about 0.01 to about 0.1 grams per cubic centimeter, the intertwining being such that a needle commonly used in needle processing technology to stitch material together may penetrate said aggregate and grip and withdraw a fiber from said aggregate free from encountering any substantial resistance by the aggregate so that the withdrawn length of fiber extends out of the aggregate without losing its cohesion with the aggregate; and a multiplicity of needle processed connecting fibers interconnecting said fiber aggregates to form said non-woven fibrous layer.

2. A textile material, as claimed in claim 1, wherein said fiber aggregates are actively needle processed by said connecting fibers being passed therethrough.

3. A textile material, as claimed in claim 1, wherein said fiber aggregates are passively needle-processed by said connecting fibers being passed therethrough.

4. A textile material, as claimed in claim 1, wherein said fibrous layer has a predetermined depth, and each fiber aggregate has a prearranged thickness substantially corresponding to said predetermined depth.

5. A textile material as claimed in claim 1, wherein each fiber aggregate is substantially shaped as a sphere.

6. A textile material, as claimed in claim 1, wherein each fiber aggregate is substantially shaped as an ellipsoid.

7. A textile material, as claimed in claim 1 wherein each fiber aggregate is substantially shaped as a cylinder.

8. A textile material, as claimed in claim 1, wherein each fiber aggregate is substantially worm-shaped.

9. A textile material, as claimed in claim 1, wherein said fibrous layer is substantially composed of said fiber aggregates.

10. A textile material, as claimed in claim 1 further comprising a carrier, and wherein said fiber aggregates are connected to said carrier.

11. A textile material, as claimed in claim 10, wherein said carrier is needle-processable.

12. A textile material as claimed in claim 11, wherein said carrier is passively needle-processable, and further comprising a plurality of connecting fibers connecting said fiber aggregates to said carrier.

13. A textile material, as claimed in claim 12, wherein said carrier is a sheet of synthetic material.

14. A textile material, as claimed in claim 12, wherein said carrier is a fabric.

15. A textile material, as claimed in claim 12, wherein said carrier is a netting.

16. A textile material, as claimed in claim 12, wherein said carrier is a paper product.

17. A textile material, as claimed in claim 12, wherein said carrier is a fibrous connecting layer.

18. A textile material, as claimed in claim 10, wherein said carrier includes textile fibers and is actively needle-processable.

19. A textile material, as claimed in claim 1, wherein the fibers of said fiber aggregates are natural fibers.

20. A textile material, as claimed in claim 1, wherein the fibers of said fiber aggregates are synthetic fibers.

21. A textile material, as claimed in claim 1, wherein the fibers of said fiber aggregates include a mixture of natural and synthetic fibers.

22. A textile material, as claimed in claim 20, wherein said fibers are curled.

23. A textile material, as claimed in claim 1, further comprising a covering layer connected to said fibrous layer.

24. A textile material, as claimed in claim 23, wherein said covering layer is needle-processable.

25. A textile material, as claimed in claim 23, wherein said covering layer includes textile fibers.

26. A textile material, as claimed in claim 1, wherein said intertwined fibers have each a length of at least 15 mm.

27. A textile material, as claimed in claim 26, wherein said length is from about 40 mm, to about 120 mm.

28. A textile material, as claimed in claim 1, wherein said connecting fibers are connected to said fiber aggregates by stitching.

29. A textile material, as claimed in claim 1, wherein said connecting fibers are connected to said fiber aggregates by knitting.

30. A textile material, as claimed in claim 1, wherein said connecting fibers are connected to said fiber aggregates by crocheting.

31. A textile material, as claimed in claim 1, wherein said fibrous layer includes a mixture of said fiber aggregates and fibrous material of a shape different from the shape of said fiber aggregates.

32. A textile material as claimed in claim 1, wherein the fibrous layer comprises fiber aggregates which are interconnected by fibers taken from said fiber aggregates.

33. A textile material as claimed in claim 10, wherein said fiber aggregates are connected to said carrier by fibers taken from said fiber aggregates.

34. A textile material as claimed in claim 1, wherein the fibrous layer consists only of fiber aggregates which are interconnected by fibers taken from said fiber aggregates.

* * * * *